(12) United States Patent
Liu

(10) Patent No.: US 9,963,190 B1
(45) Date of Patent: May 8, 2018

(54) QUICK-RELEASE STRUCTURE

(71) Applicant: Yu-Chen Liu, Taichung (TW)

(72) Inventor: Yu-Chen Liu, Taichung (TW)

( * ) Notice: Subject to any disclaimer, the term of this patent is extended or adjusted under 35 U.S.C. 154(b) by 0 days. days.

(21) Appl. No.: 15/402,138

(22) Filed: Jan. 9, 2017

(51) Int. Cl.
*B62K 25/02* (2006.01)
*F16B 7/04* (2006.01)

(52) U.S. Cl.
CPC ............ *B62K 25/02* (2013.01); *F16B 7/0426* (2013.01); *B62K 2206/00* (2013.01)

(58) Field of Classification Search
CPC .. B62K 25/02; B62K 2206/00; B60B 27/026; B60B 27/023; F16B 2/185
See application file for complete search history.

(56) References Cited

U.S. PATENT DOCUMENTS

| | | | | |
|---|---|---|---|---|
| 4,763,957 A * | 8/1988 | Poehlmann | ........... | B60B 27/023 301/110.5 |
| 5,961,186 A * | 10/1999 | Phillips | .................. | B62K 25/02 301/110.5 |
| 7,556,321 B2 * | 7/2009 | Hara | ..................... | B60B 27/026 301/110.5 |
| 7,562,943 B2 * | 7/2009 | Kanehisa | ............... | B62K 25/02 301/124.2 |
| 7,665,928 B2 * | 2/2010 | Winefordner | ......... | B60B 27/026 403/322.4 |
| 8,905,492 B2 * | 12/2014 | Normand | ............... | B62K 25/02 301/124.2 |
| 8,991,847 B2 * | 3/2015 | Liu | ........................ | B62K 21/24 280/263 |
| 9,045,192 B2 * | 6/2015 | Schlanger | .............. | B62K 25/02 |
| 9,376,160 B2 * | 6/2016 | Pye | ......................... | B62K 25/02 |
| 9,446,626 B2 * | 9/2016 | Schlanger | ............. | B60B 27/026 |
| 2008/0284127 A1* | 11/2008 | Watarai | .................. | B62K 25/02 280/279 |
| 2012/0261979 A1* | 10/2012 | Ashman | ................ | B60B 27/026 301/124.2 |
| 2013/0328385 A1* | 12/2013 | Kuo | ....................... | B60B 27/026 301/124.2 |
| 2017/0259616 A1* | 9/2017 | Fusari | ................... | B60B 27/026 |

* cited by examiner

*Primary Examiner* — Jonathan P Masinick

(74) *Attorney, Agent, or Firm* — Raymond Y. Chan; David and Raymond Patent Firm

(57) ABSTRACT

A quick-release structure includes a shaft having a through hole and a circular magnetic member in the through hole; a circular shaft head having a slot at a front end thereof and two side holes; a stop ring connected with the circular shaft head screwed to the shaft; a drive lever having a lever head and a lever body, two sides of the drive lever having guide grooves respectively, the lever body being inserted into the through hole, the lever head being inserted into the slot and a distal end of the lever body is attracted by the magnetic member; and two engaging members screwed to the side holes and leaning against the guide grooves, the drive lever being movable along the guide grooves, the engaging members functioning as a pivot so that the drive lever can be turned left and right to rotate the shaft.

7 Claims, 9 Drawing Sheets

_US 9,963,190 B1_
1

QUICK-RELEASE STRUCTURE

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a quick-release structure, and more particularly to a quick-release structure for a bicycle to provide a drive lever which can be hidden in a shaft when it is not in use.

Description of Related Arts

As shown in FIGS. 1 and 2, a conventional bicycle quick-release structure comprises a shaft 10 connected to two forks 1 and a wheel axle 2 of a bicycle. One end of the shaft 10 is provided with outer threads 11 to engage with one of the two forks 1. The other end of the shaft 10 is provided with a screw hole 12 and an interlocking rod 13. The interlocking rod 13 has a connecting head 131 and is connected with a fastening block 14 and a positioning seat 15. An inner end face of the poisoning seat 15 is provided with an annular toothed portion 151. An outer end face of the other fork 1 is provided with an annular toothed face 3 to mate with the annular toothed portion 151. The connecting head 131 of the interlocking rod 13 is eccentrically pivotally connected with a drive lever 16. The drive lever 16 is pulled down or up for actuating the interlocking rod 13 and the shaft 10 to achieve the purpose of locking or unlocking. The above-mentioned structure has the following drawbacks:

1. When the drive lever 16 is locked, it is necessary to dodge the fork 1 to be locked and positioned. Therefore, when the shaft 10 is tightened to lock the wheel axle 2, it is required to cooperate with the angle of the fork 1. Thus, the angle of the drive lever 16 is adjusted by tightening or releasing more. This is very cumbersome and inconvenient.

2. No matter what angle of the drive lever 16 is locked, it is exposed. Sometimes, the drive lever 16 may be touched erroneously to cause a looseness of the shaft 10. This is not safe for use.

Accordingly, the inventor of the present invention has devoted himself based on his many years of practical experiences to solve these problems.

SUMMARY OF THE PRESENT INVENTION

The primary object of the present invention is to solve the foregoing problems and to provide a quick-release structure. A drive lever is inserted through a slot of a circular shaft head into a shaft. Two engaging members located at two sides of the slot are engaged with guide grooves of the drive lever so that the drive lever won't be detached erroneously and is attracted by a magnetic member disposed in the shaft. When in use, the drive lever is pulled outward to disengage from the magnetic member to be separated from the shaft. The drive lever is turned with the engaging members as the

2 pivot so as to drive the shaft to rotate. The drive lever can be stored and hidden without exposure to avoid inadvertently touching the drive lever and to enhance the effect of security.

DETAILED DESCRIPTION OF THE PREFERRED EMBODIMENT

Figure 1:
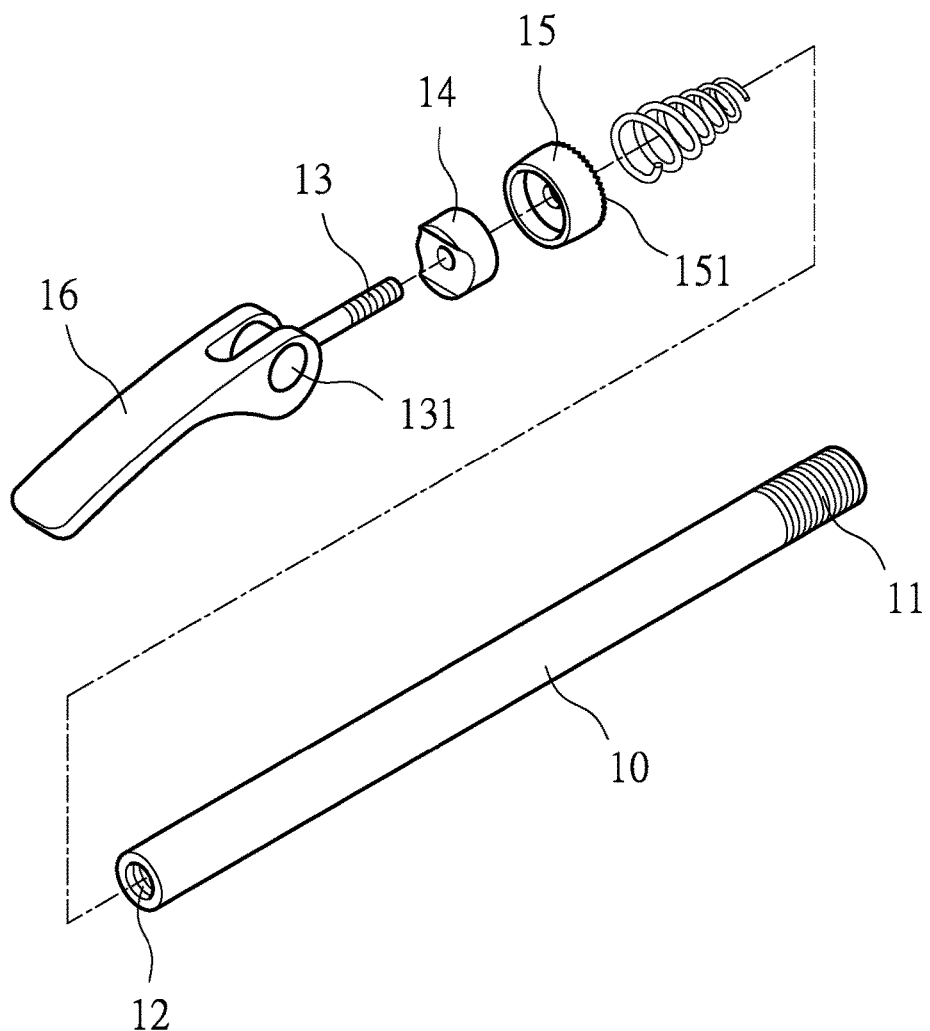
FIG. 1 is an exploded view of a conventional quick-release structure.
Figure 2:
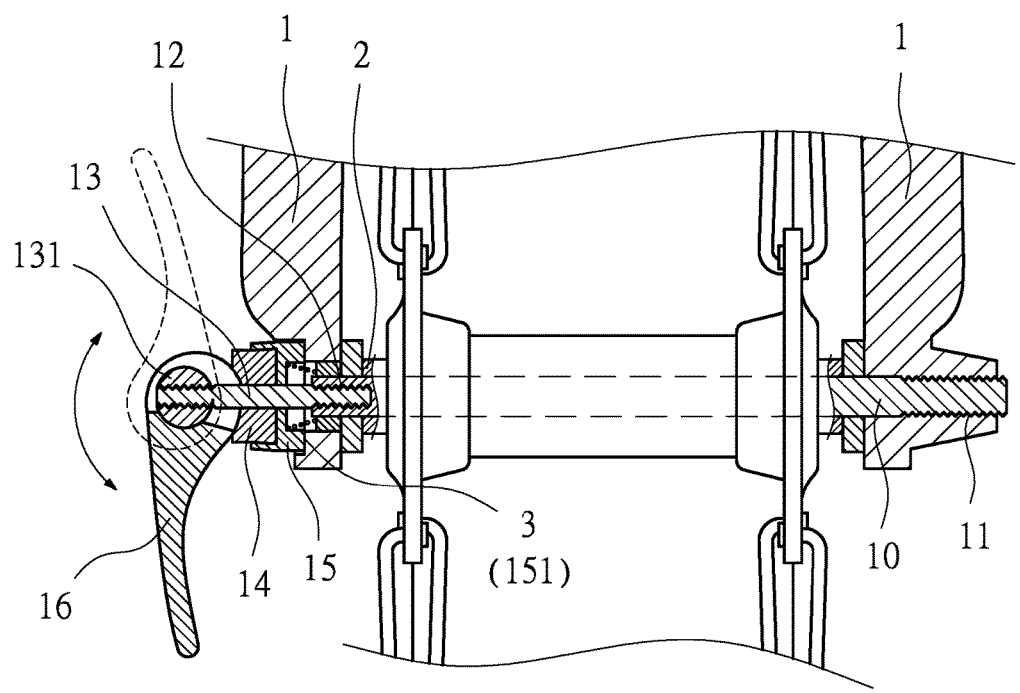
FIG. 2 is a sectional view of the conventional quick-release structure.
Figure 3:
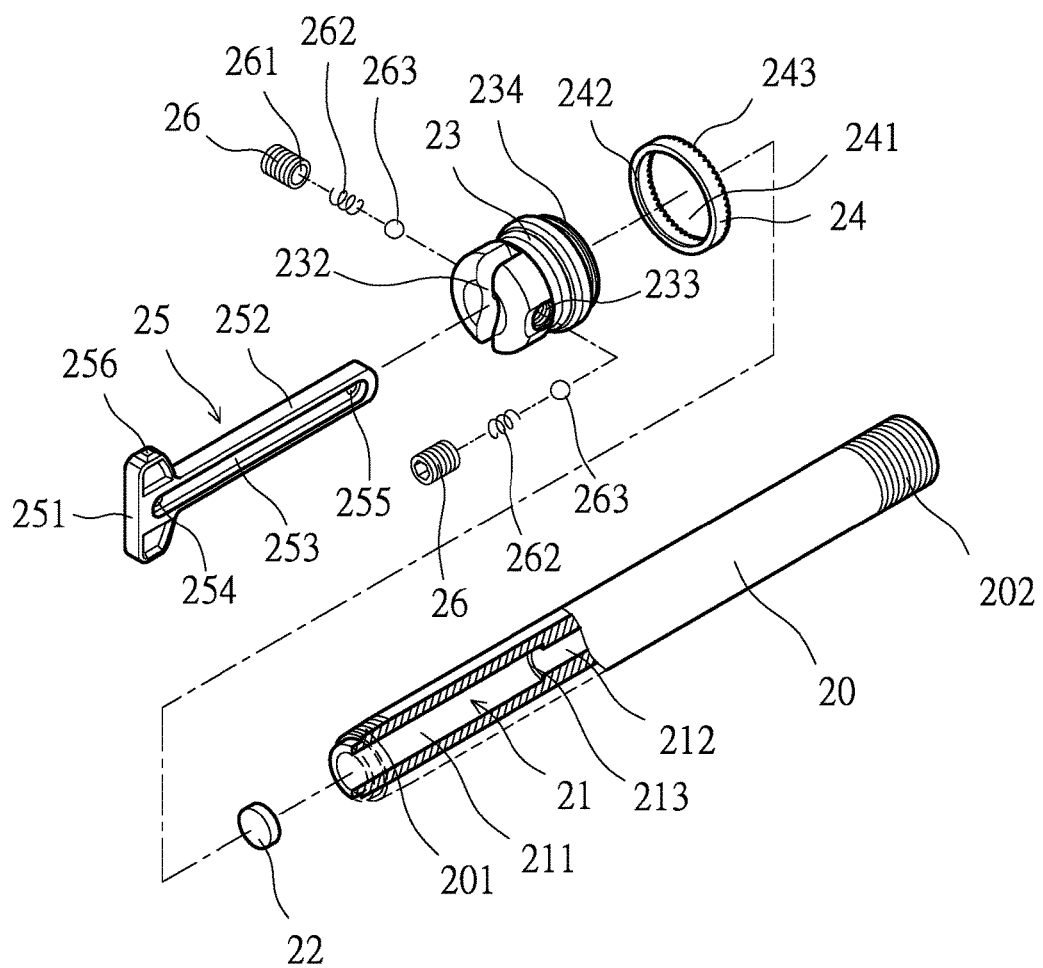
FIG. 3 is an exploded view in accordance with an embodiment of the present invention.
Figure 4:
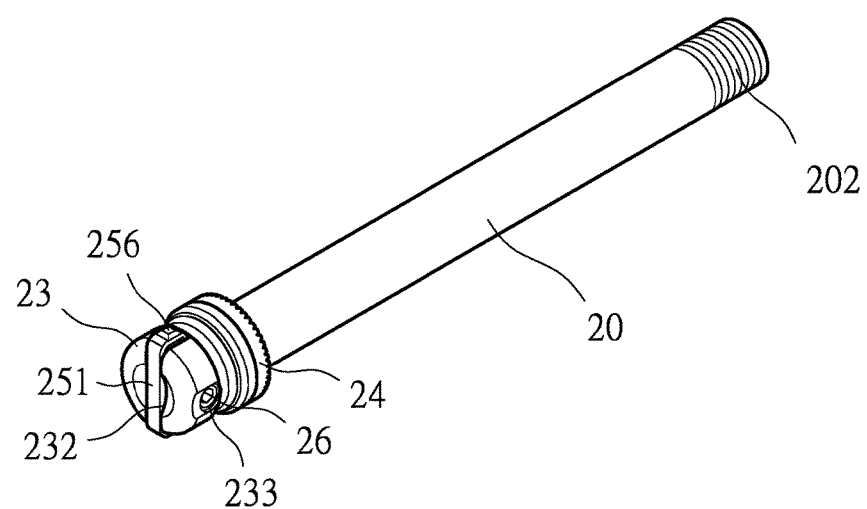
FIG. 4 is a perspective view in accordance with the embodiment of the present invention.
Figure 5:
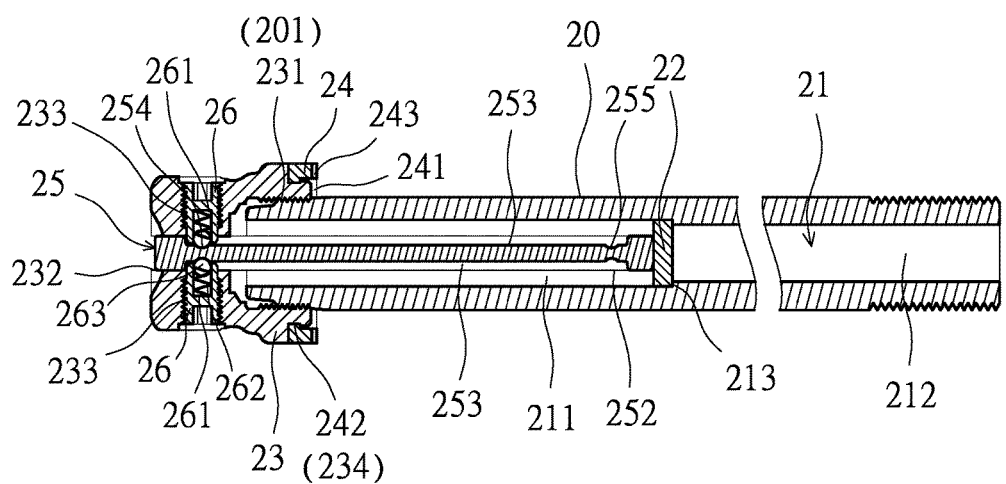
FIG. 5 is a lateral sectional view in accordance with the embodiment of the present invention.

Embodiments of the present invention will now be described, by way of example only, with reference to the accompanying drawings.

Referring to FIG. 3 to FIG. 6, a quick-release structure according to an embodiment of the present invention comprises a shaft 20, a circular shaft head 23, a stop ring 24, a drive lever 25, and two engaging members 26.

The shaft 20 is a hollow cylindrical rod and has a through hole 21 therein. The through hole 21 has a large-diameter section 211 at a front end thereof, a small-diameter section 212 at a rear end thereof, and a step between the large-diameter section 211 and the small-diameter section 212 to form a limit edge 213. A circular magnetic member 22 is provided and attached to the limit edge 213. The magnetic member 22 has a diameter greater than that of the small-diameter section 212. The exterior of a front end of the shaft 20 is formed with a threaded section 201. The exterior of a rear end of the shaft 20 is formed with outer threads 202. The circular shaft head 23 has an inner screw hole 231. A front end of the circular shaft head 23 is formed with a slot 232 which is in communication with the inner screw hole 231 and extends through two sides of the circular shaft head 23. The circular shaft head 23 has a pair of side holes 233 at two sides of the slot 232 and communicating with the slot 232. The interior of each side hole 233 is formed with threads. The outer circumferential edge of the rear end of the circular shaft head 23 is provided with an outer annular groove 234. The stop ring 24 is formed in a disc shape and has a central perforation 241. An outer peripheral edge of an outer end of the perforation 241 is provided with an inner annular flange 242. An inner end face of the perforation 214 is provided with teeth 243. The inner annular flange 242 of the stop ring 24 is engaged with the outer annular groove 234 of the circular shaft head 23 so that the stop ring 24 is rotatably connected to the circular shaft head 23. The inner screw hole 231 of the circular shaft head 23 is threadedly engaged with the threaded section 201 of the shaft 20, such that the shaft 20 is inserted through the perforation 241 and connected to the circular shaft head 23. The drive lever 25 is in the form of a flat plate-like handle made of metal and has a thickness less than or equal to the width of the slot 232. The drive lever 25 has a lever head 251 and a lever body 252. The lever head 251 has a lateral length greater than or equal to the lateral length of the slot 232. Two sides of the drive lever 25 are provided with a pair of guide grooves 253 extending longitudinally along the lever body 252. Each of the guide grooves 253 is provided with a first positioning recess 254 at a front end thereof and a second positioning recess 255 at a rear end thereof. The lever body 252 of the drive lever 25 is inserted through the slot 232 and the inner screw hole 231 of the circular shaft head 23 into the large-diameter section 211 of the through hole 21, so that the lever head 251 is inserted into the slot 232 and a distal end of the lever body 252 is attracted by the magnetic member 22 to be positioned in place. The two engaging members 26 are countersunk bolts. An end of each engaging member 26 has an accommodation hole 261 to accommodate a spring 262 and a steel ball 263 in sequence. A hole opening of the accommodation hole 261 is formed with a concave by riveting and pressing to mate with the steel ball 263. The steel ball 263 is biased by the spring 262, and a portion of the steel ball 263 is exposed out of the accommodation hole 261. The engaging members 26 with the steel balls 263 are screwed to the side holes 233, so that the steel balls 263 of the engaging members 26 lean against the guide grooves 253 and the drive lever 25 is able to slide within the range of the length between the front and rear ends of the guide groove 253. The steel ball 263 can be pressed into the first positioning recess 254 or the second positioning recess 255.

The rear ends of the guide grooves 253 are held by the engaging members 26 so that the drive member 25 won't be detached. The drive lever 25 uses the steel balls 263 of the engaging members 26 as a pivot so that the drive lever 25 can be pulled and turned an angle, and the drive lever 25 forms the arm of force for the circular shaft head 23 and the shaft 20 to turn left and right to bring the shaft 20 to rotate. Through the aforesaid structure, the drive lever 25 can be pulled out for turning the shaft when in use and can be hidden when not in use.

The details of the assembly of the present invention are described below. As shown in FIGS. 3, 4, 5 and 6, the present invention utilizes the lever body 252 of the drive lever 25 to have a width less than the diameter of the through hole 21 of the shaft 20 to hide the lever body 252 and the slot 232 is adapted to accommodate the lever head 251 so that the drive lever 25 can be hidden. To assemble the present invention, the inner screw hole 231 of the circular shaft head 23 is screwed to the threaded section 201 of the shaft 20. Furthermore, the circular shaft head 23 can be securely connected to the shaft 20 by gluing. When the engaging members 26 are screwed into the side holes 233, the steel balls 263 are pressed against the guide grooves 253 at the two sides of the drive lever 25 so that the drive lever 25 can be stabilized without shaking during pulling or pushing to avoid making a noise. The length of the guide grooves 253 extend from the lever head 251 to the distal end of the lever body 252, such that the drive lever 25 can be slid back and forth and the steel balls 263 can be positioned in the first positioning recesses 254 or the second positioning recesses 255 of the guide grooves 253. When the drive lever 25 is pushed inward and the steel balls 263 are positioned in the first positioning recesses 254 of the guide grooves 253, the drive lever 25 is attracted by the magnetic member 22 and the first positioning recesses 254 assist in positioning the drive lever 25 more securely. When the drive lever 25 is pulled outward and the steel balls 263 are positioned in the second positioning recesses 255 of the guide grooves 253, the lever body 252 can be completely separated from the through hole 21 so as not to be hindered by the through hole 21. The steel balls 263 of the engaging members 26 function as the pivot to be turned in the slot 232. The drive lever 25 is made of a ferromagnetic metallic material, such as iron (Fe), cobalt (Co), nickel (Ni), and the like. The magnetic member 22 is a circular magnet. Therefore, the magnetic member 22 has magnetism to attract the drive lever 25, so that the drive lever 25 won't be erroneously protruded. Either side of the lever head 251 is provided with a protrusion 256 to ensure that the circular shaft head 23 can be further protruded out of both sides of the lever head 251, so that the user can easily pull the drive lever 25 with his/her fingers.

Figure 6:
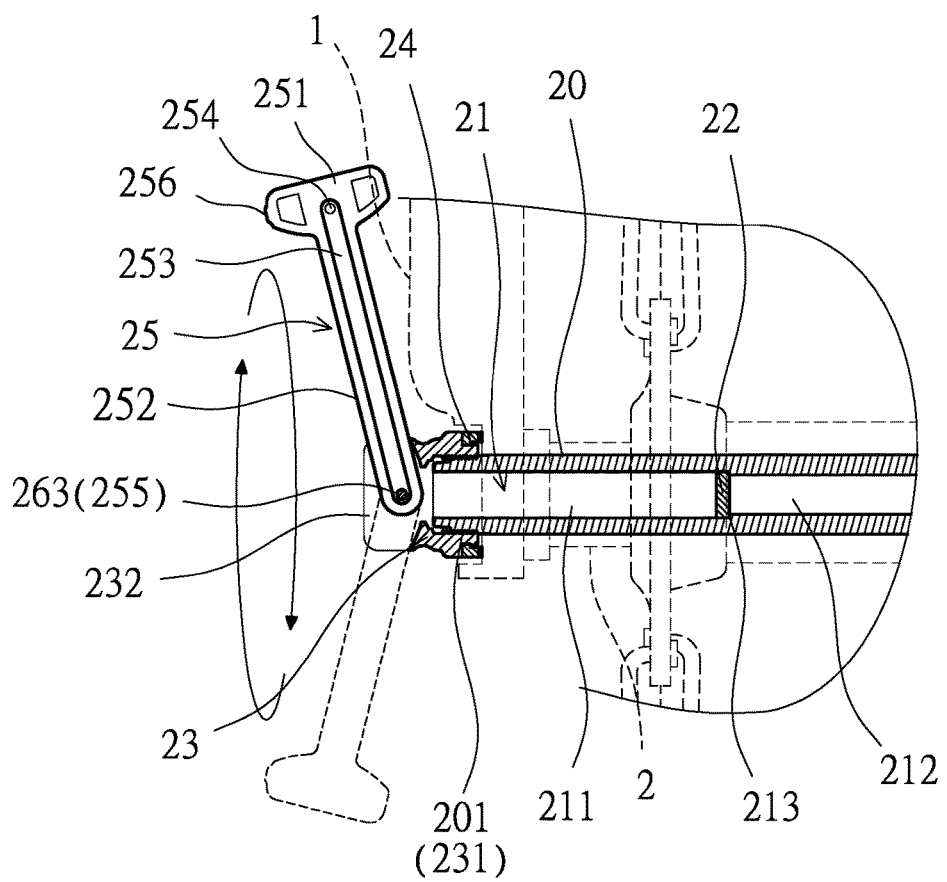
FIG. 6 is a schematic view in accordance with the embodiment of the present invention, showing the drive lever in a use state.
Figure 7:
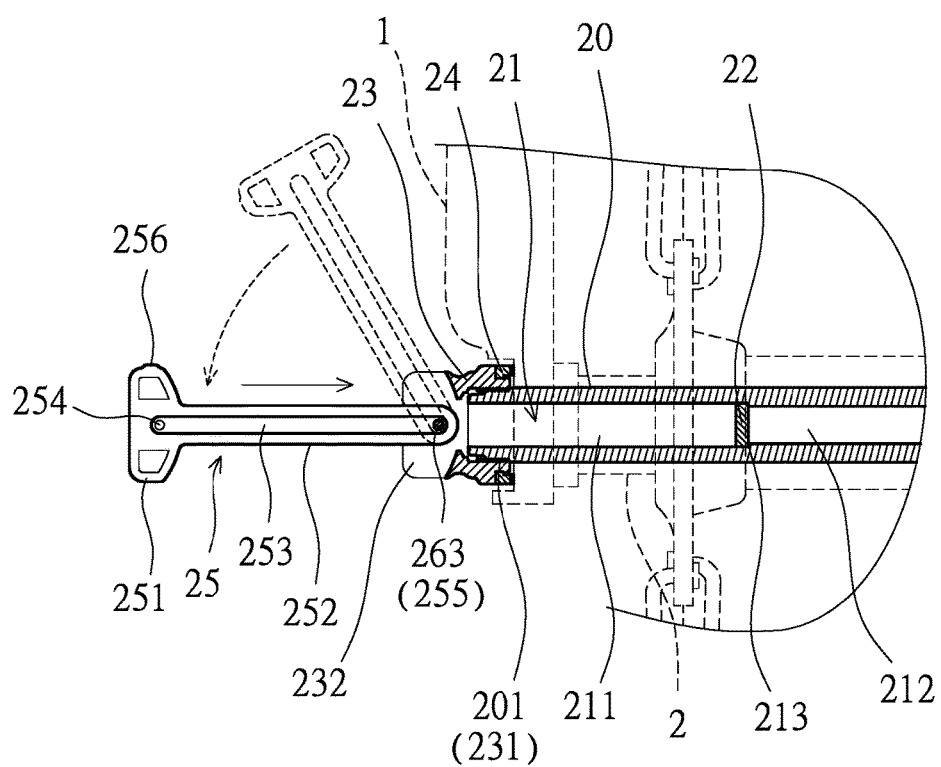
FIG. 7 is a schematic view in accordance with the embodiment of the present to invention, showing the drive lever in a stored state.
Figure 8:
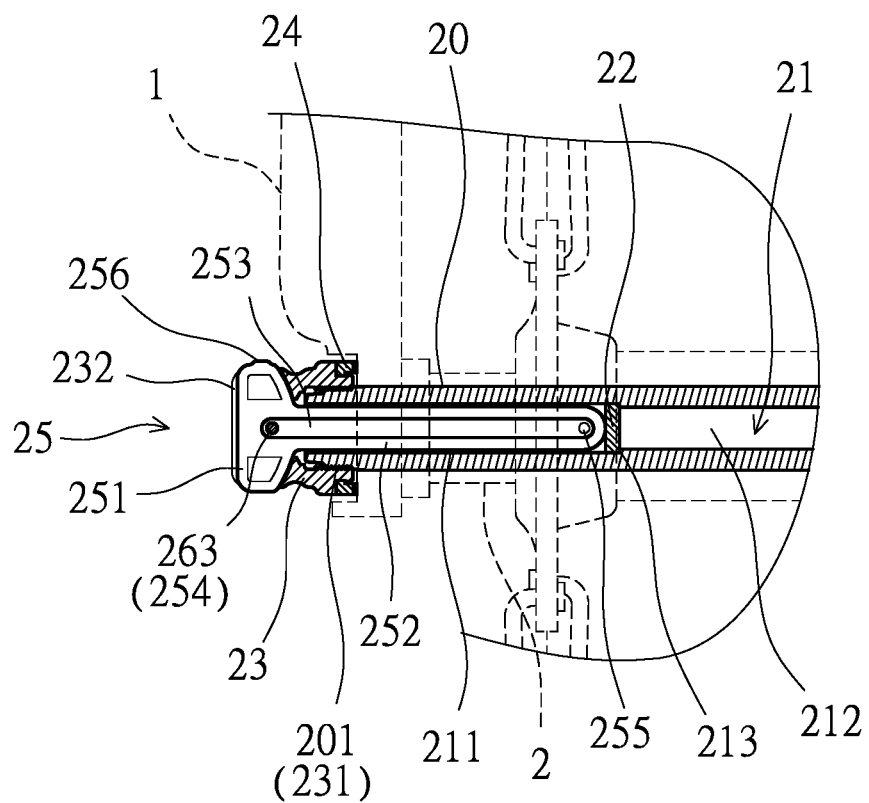
FIG. 8 is a schematic view in accordance with the embodiment of the present invention, showing the drive lever in a hidden state.

Referring to FIGS. 6 to 8, when the user wants to screw or unscrew the outer threads 202 of the shaft 20, the drive lever 25 may be pulled outward by applying a force greater than the force of the magnetic member 22 and the first positioning recesses 254, such that the steel balls 263 of the engaging members 26 are positioned in the second positioning recesses 255, the steel balls 263 are used as the pivot to turn the drive lever 25 to the direction perpendicular to the shaft 20 (as shown in FIG. 6). The drive lever 25 is turned left and right to rotate the shaft 20 (the shaft 20 and the circular shaft head 23 has been glued together), such that the outer threads 202 can be screwed to or unscrewed from the fork 1 of the bicycle. There is no need to use a tool for turning the shaft 20. After use, the steel balls 263 are used as the pivot again to turn the drive lever 25 to the direction parallel to the shaft 20 (as shown in FIG. 7). The drive lever 25 is pushed in the direction of the through hole 21. The lever body 252 of the drive lever 25 is inserted into the large-diameter section 211 of the through hole 21. The lever head 251 is accommodated in the slot 232. The distal end of the lever body 252 abuts against the magnetic member 22. The steel balls 263 are positioned in the first positioning recesses 254 again (as shown in FIG. 8). The drive lever 25 is attracted by the magnetic member 22 again and won't be erroneously protruded so that the drive lever 25 can be hidden in the shaft 20 and the circular shaft head 23. Therefore, the drive lever 25 does not need to dodge the fork 1 in consideration of the problem of the screwing angle of the shaft 20, and the drive lever 25 is not exposed without the risk of erroneously shifting to loosen the wheel axle 2.

Figure 9:
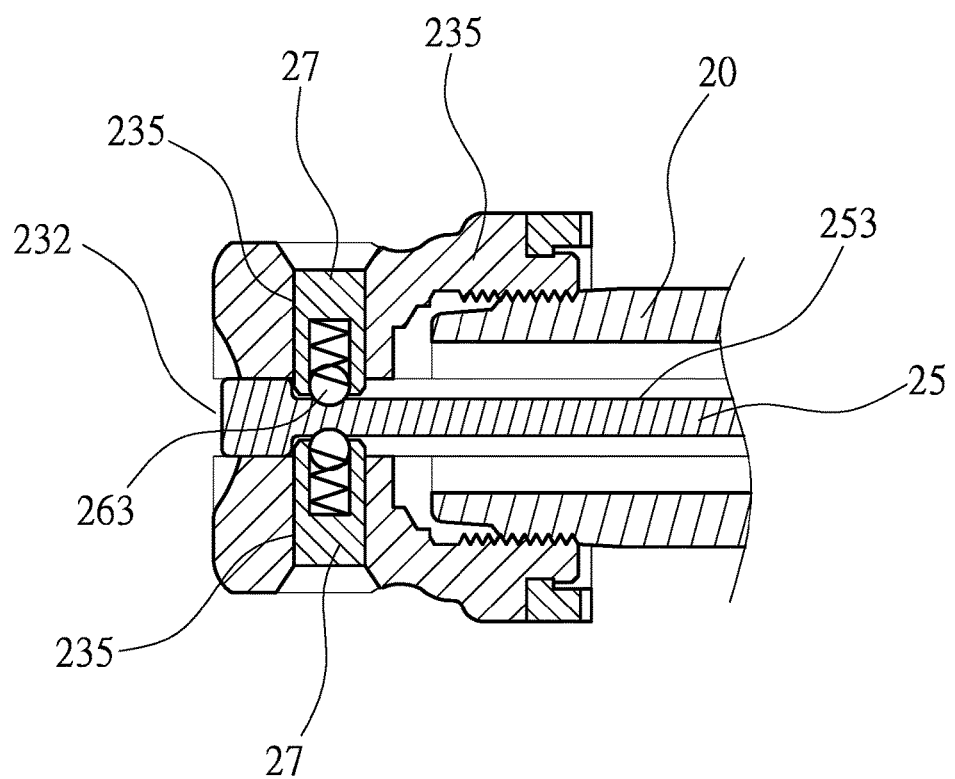
FIG. 9 is a sectional view of the engaging members in accordance with another embodiment of the present invention.

The present invention may also be implemented as shown in FIG. 9. The side holes 235 at the two sides of the slot 232 are smooth holes, and the engaging members 27 are cylindrical rods each having a smooth outer surface. The side holes 235 each have a diameter less than the diameter of the engaging members 27. The engaging members 27 are forcibly plugged into the side holes 235 by a processing machine so that the engaging members 27 cannot be withdrawn and the steel balls 263 leans against the guide grooves 253. The engaging members 27 will no longer be detached externally, thereby achieving the effect of avoiding any disassembly.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A quick-release structure, comprising:

a shaft, the shaft being a hollow cylindrical rod and having a through hole therein, the through hole being provided with a circular magnetic member; an exterior of a front end of the shaft being formed with a threaded section, an exterior of a rear end of the shaft being formed with outer threads;

a circular shaft head, the circular shaft head having an inner screw hole, a front end of the circular shaft head being formed with a slot which is in communication with the inner screw hole and extends through two sides of the circular shaft head, the circular shaft head having a pair of side holes at two sides of the slot and communicating with the slot, an outer circumferential edge of a rear end of the circular shaft head being provided with an outer annular groove;

a stop ring, the stop ring being formed in a disc shape and having a central perforation, an outer peripheral edge of an outer end of the perforation being provided with an inner annular flange, an inner end face of the perforation being provided with teeth; the inner annular flange of the stop ring being engaged with the outer annular groove of the circular shaft head so that the stop ring is rotatably connected to the circular shaft head; the inner screw hole of the circular shaft head being threadedly engaged with the threaded section of the shaft so that the shaft is inserted through the perforation and connected to the circular shaft head;

a drive lever, the drive lever being in the form of a flat plate-like handle made of metal, the drive lever having a lever head and a lever body, two sides of the drive lever being provided with a pair of guide grooves extending longitudinally along the lever body, the lever body of the drive lever being inserted through the slot and the inner screw hole of the circular shaft head into the through hole so that the lever head is inserted into the slot and a distal end of the lever body is attracted by the magnetic member; and two engaging members, the engaging members being screwed to the side holes for the engaging members to lean against the guide grooves, the drive lever being movable within the range of the length between front and rear ends of the guide grooves, the rear ends of the guide grooves being held by the engaging members so that the drive member cannot disengage from the circular shaft head, wherein the engaging members can function as a pivot so that the drive lever can be pulled and turned and the drive lever forms an arm of force for the circular shaft head and the shaft to turn left and right so as to bring the shaft to rotate.

2. The quick-release structure as claimed in claim 1, wherein the through hole has a large-diameter section at a front end thereof, a small-diameter section at a rear end thereof, and a step between the large-diameter section and the small-diameter section to form a limit edge, the circular magnetic member is attached to the limit edge, and the lever body of the drive lever is inserted into the large-diameter section and attracted by the magnetic member.

3. The quick-release structure as claimed in claim 1, wherein each of the guide grooves is provided with a first positioning recess at the front end thereof and a second positioning recess at the rear end thereof; an end of each of the engaging members has an accommodation hole to accommodate a spring and a steel ball in sequence, a hole opening of the accommodation hole is formed with a concave by riveting and pressing to mate with the steel ball, the steel ball is biased by the spring, and a portion of the steel ball is exposed out of the accommodation hole so that the steel ball leans against a corresponding one of the guide grooves and can be positioned in the first positioning recess or the second positioning recess.

4. The quick-release structure as claimed in claim 3, wherein the side holes each have threads therein, the engaging members are countersunk bolts, and the engaging members are screwed to the side holes.

5. The quick-release structure as claimed in claim 3, wherein the side holes are smooth holes, the engaging members are cylindrical rods each having a smooth outer surface, the side holes each have a diameter less than that of the engaging members, and the engaging members are forcibly plugged into the side holes.

6. The quick-release structure as claimed in claim 1, wherein the drive lever has a thickness less than or equal to a width of the slot, and the lever head has a lateral length greater than or equal to that of the slot.

7. The quick-release structure as claimed in claim 6, wherein a side of the lever head is provided with a protrusion.

* * * * *